US008479716B2

(12) United States Patent
Ide et al.

(10) Patent No.: US 8,479,716 B2
(45) Date of Patent: Jul. 9, 2013

(54) EXHAUST GAS RE-CIRCULATION CONTROL UNIT FOR A DIESEL ENGINE

(75) Inventors: Kazunari Ide, Nagasaki (JP); Satoshi Iwasaki, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 666 days.

(21) Appl. No.: 12/679,411

(22) PCT Filed: Apr. 21, 2009

(86) PCT No.: PCT/JP2009/058232
§ 371 (c)(1),
(2), (4) Date: May 6, 2010

(87) PCT Pub. No.: WO2009/013928
PCT Pub. Date: Nov. 19, 2009

(65) Prior Publication Data
US 2010/0282222 A1    Nov. 11, 2010

(30) Foreign Application Priority Data

May 12, 2008    (JP) .................................. 2008-124679

(51) Int. Cl.
*F02B 47/08* (2006.01)
(52) U.S. Cl.
USPC ................... 123/568.19; 123/568.21; 701/108
(58) Field of Classification Search
USPC .......................... 123/568.19, 568.21; 701/108
See application file for complete search history.

(56) References Cited

U.S. PATENT DOCUMENTS 6,289,883 B1 * 9/2001 Wakutani et al. ......... 123/568.21
6,354,269 B1 * 3/2002 Saito et al. ..................... 123/436

(Continued)

FOREIGN PATENT DOCUMENTS

CN    1580532    2/2005
CN    101065564    10/2007

(Continued)

OTHER PUBLICATIONS

International Preliminary Report on Patentability and Written Opinion of the International Searching Authority issued Dec. 23, 2010 in International (PCT) Application No. PCT/JP2009/058232.

(Continued)

*Primary Examiner* — Thomas Moulis
(74) *Attorney, Agent, or Firm* — Wenderoth, Lind & Ponack, L.L.P.

(57) ABSTRACT

An EGR control unit for enhancing the performance as to the EGR rate and the engine acceleration, the unit being configured so as to control the EGR valve and the intake air valve with a simple control command signal that makes both the valves be operated in a coupled mode, whereby the response performance as to the engine speed during acceleration as well as the EGR gas flow rate is enhanced by means of compensation regarding the dead zones inherent in the intake air throttle valve and the EGR valve. An EGR control unit including; a dead zone evaluating means 64 that calculates the estimation excess air ratio $\lambda$ in consideration of the residual air in the EGR gas; thereby, it is judged that at least one of the EGR valve 27 and the intake air throttle valve 29 is operated in the dead zone based on the rate of change of the calculated estimation excess air ratio $\lambda$ when the rate of change of the ratio $\lambda$ is smaller than a prescribed level; and a dead zone compensating means 66 that makes the revisions regarding the opening command signals as to the EGR valve and the intake air throttle valve so that the dead zones do not hinder the coupled operation between the valves when the dead zone evaluating means judges that at least one of the EGR valve and the air throttle valve is operated in the dead zone, and the engine is under a transient response condition.

7 Claims, 8 Drawing Sheets

U.S. PATENT DOCUMENTS

| | | | |
|---|---|---|---|
| 6,725,832 B2 * | 4/2004 | Yokoyama et al. | 123/396 |
| 6,868,329 B2 * | 3/2005 | Ito et al. | 701/108 |
| 7,104,260 B2 * | 9/2006 | Nakazawa et al. | 123/568.21 |
| 7,848,872 B2 * | 12/2010 | Ma et al. | 701/108 |
| 8,104,457 B2 * | 1/2012 | Ide et al. | 123/568.18 |
| 8,108,128 B2 * | 1/2012 | Zurlo et al. | 701/108 |
| 8,156,925 B2 * | 4/2012 | Tabata | 123/568.19 |
| 2002/0134333 A1 | 9/2002 | Miyashita | |
| 2003/0098014 A1 * | 5/2003 | Yokoyama et al. | 123/399 |
| 2005/0028785 A1 | 2/2005 | Harunari et al. | |
| 2008/0167790 A1 | 7/2008 | Kotooka et al. | |
| 2012/0318246 A1 * | 12/2012 | Ichihara et al. | 123/568.19 |

FOREIGN PATENT DOCUMENTS

| | | |
|---|---|---|
| JP | 7-189763 | 7/1995 |
| JP | 2000-130265 | 5/2000 |
| JP | 2001-152916 | 6/2001 |
| JP | 2002-30963 | 1/2002 |
| JP | 2002-276397 | 9/2002 |
| JP | 2003-166445 | 6/2003 |
| JP | 2005-076498 | 3/2005 |
| JP | 2006-90204 | 4/2006 |
| JP | 2007-247445 | 9/2007 |
| RU | 2 230 212 | 4/2003 |
| SU | 674686 | 7/1979 |
| SU | 703042 | 12/1979 |

OTHER PUBLICATIONS

International Search Report issued Jun. 9, 2009 in International (PCT) Application No. PCT/JP2009/058232.

Russian Office Action having a date of Sep. 27, 2011 in corresponding Russian Patent Application No. 2010115106/06 with English translation.

* cited by examiner

EXHAUST GAS RE-CIRCULATION CONTROL UNIT FOR A DIESEL ENGINE

TECHNICAL FIELD

This application relates to an EGR (Exhaust Gas Re-circulation) control unit for a diesel engine.

BACKGROUND ART

The EGR (Exhaust Gas Re-circulation) method is known as a technology that is used for reducing problematic NOx (nitrogen oxide) in exhaust gas emitted from a diesel engine.

Moreover, when the EGR method is applied, the amount of fresh air (a fresh intake air flow rate) inhaled by the engine decreases relatively which is prone to cause an $O_2$-deprived (oxygen-deprived) atmosphere in a combustion chamber of the engine when the engine is rapidly accelerated or a fuel admission opening of the engine is rapidly increased.

Specifically, when an EGR valve and an intake air throttle valve of the engine are concurrently used in order to raise EGR rate (a ratio of EGR gas in the air-gas mixture inhaled into the cylinders of the engine, in general), a sufficient EGR rate cannot be achieved only by opening the EGR valve fully. Thus, beside the EGR valve, the intake air throttle valve is activated in a closing direction so as to decrease the inhaled fresh air and enhance the EGR rate (the EGR gas flow rate). As a result, an $O_2$-deprived (oxygen-deprived) atmosphere is prone to occur in the combustion chamber of the engine.

In the case of using the EGR valve and the intake air throttle valve of the engine concurrently, the EGR valve control and the throttle valve control are conventionally performed independently, namely, in an uncoupled mode. For instance, an example technology is disclosed in the patent reference 1 (JP2006-90204), whereby the EGR valve and the intake air throttle valve are controlled by different command signals independently. Thus, in the technology by the reference 1, the number as to the degrees of freedom in connection with valve control operations becomes large. Therefore, the calibration man-hours for determining an optimal control conditions have to be increased.

Figure 11:
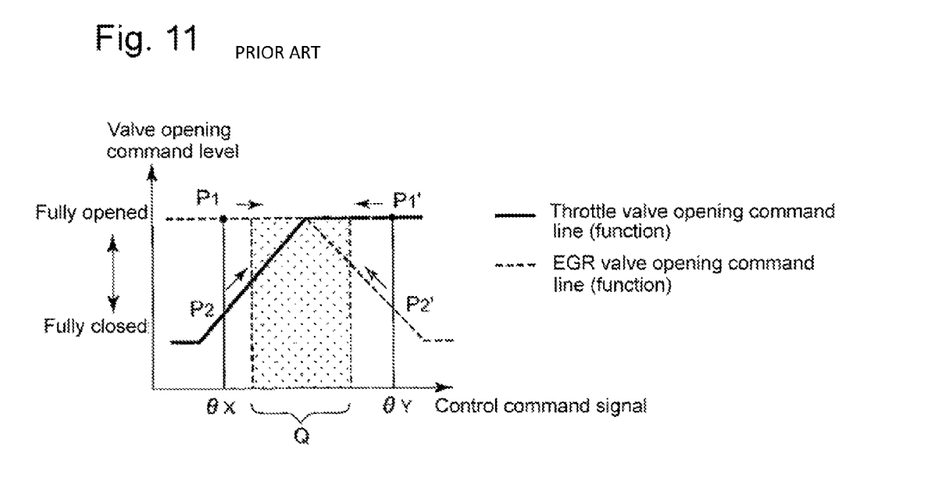
FIG. 11 explains a known technology.
Figure 12:
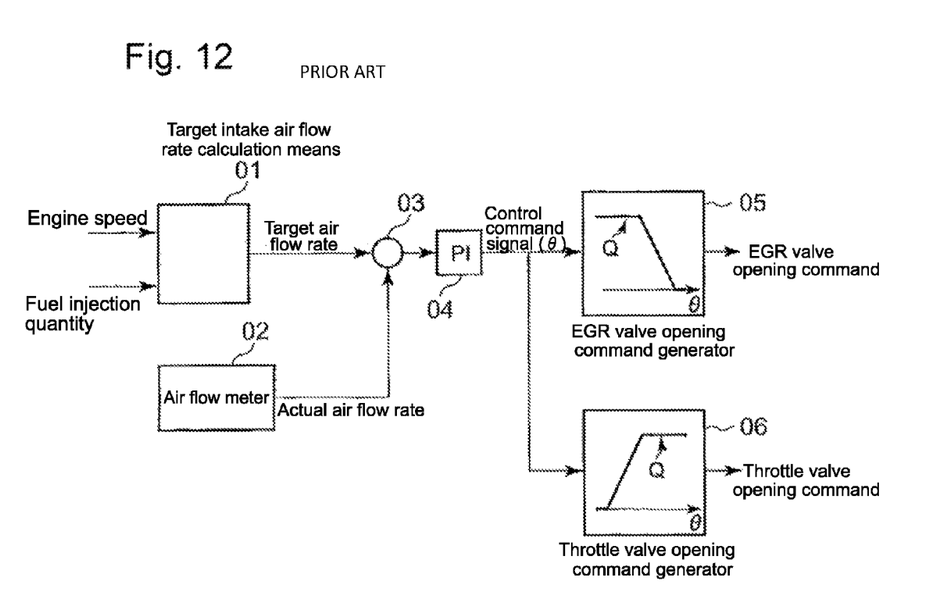
FIG. 12 explains a known technology.

In order to simplify the calibration work, it is known that the EGR valve movement is associated with the throttle valve movement as if the two valves were integrated into one valve; that is, as shown in FIGS. 11 and 12, a set of the EGR valve opening command and the throttle valve command is forwarded in response to a simple control command signal.

FIG. 12 (as to a known technology) shows an example of the above-mentioned simple control command signal that corresponds to a signal θ in the figure; whereby, the signal θ is a control command signal in the control block diagram (FIG. 12 itself) that is a part of a feedback system in which a signal of the target intake air flow rate, together with a signal of the actual intake air flow rate, produces the control command signal. To be more precise, a target air flow rate calculating means 01 calculates a target air flow rate in response to an engine speed and a fuel injection quantity per shot; the target air flow rate is compared with an actual air flow rate that is detected by an air flow meter 02; the difference between the flow rates is yielded through an adder-subtracter 03; based on the difference, a PI control calculation means 04 outputs the control command signal θ; the outputted control command signal θ is converted into an EGR valve opening command signal, through an EGR valve opening command generator 05 (see FIG. 12); the signal θ is also converted into an intake air throttle valve opening command signal, through a throttle valve opening command generator 06 (see FIG. 12).

However, interlocking the movements of the EGR valve and the intake air throttle valve by a simple control command signal so as to operate both the valves as one as shown in FIGS. 11 and 12 contains some difficulties as described below.

Each function (the relation between the opening and the air/gas flow rate) of the valves has a dead zone (FIG. 11) in which the air/gas flow rate dose not change when the opening exceeds a certain level; accordingly, in the case where the intake air throttle valve is opening, the control command signal moves right from the point $θ_x$ in FIG. 11, and the throttle valve is activated in an opening direction from the point $P_2$ (FIG. 11) to the full opening point; thereby, the opening of the EGR valve moves right from the point $P_1$ (FIG. 11), and continues to be fully opened in a dead zone Q (FIG. 11) for a while; thus, unless the EGR valve opening is narrowed to a certain degree, the EGR gas flow rate cannot decrease; in this way, even when the intake air throttle valve is activated toward the full opening, a sufficient amount of air cannot be quickly inhaled into the combustion chamber; as a result, there is a difficulty that the engine suffers from insufficient response performance.

Moreover, in the case where the EGR valve is opening, the control command signal moves left from the point $θ_y$ in FIG. 11, and the EGR valve is activated in an opening direction from the point $P_2'$ (FIG. 11) to the full opening point; thereby, the opening of the throttle valve moves left from the point $P_1'$ (FIG. 11), and continues to be fully opened in a dead zone Q (FIG. 11) for a while; thus, unless the throttle valve opening is narrowed to a certain degree, the intake air flow rate cannot decrease; in this way, even when the EGR valve is activated toward the full opening, a sufficient amount of EGR gas (a sufficient EGR rate) cannot be quickly increased; as a result, there is a difficulty that the engine suffers from insufficient response performance.

Thus, in the case where the EGR valve movement is associated with the throttle valve movement as if the two valves were integrated into one valve, the response performance as to the engine acceleration as well as the EGR gas flow rate is prone to be deteriorated, due to the dead zone characteristics inherent to the EGR valve and the intake air throttle valve.

DISCLOSURE OF THE INVENTION

In view of the above-stated conventional technology and anticipated solutions thereof, the present disclosure aims at providing an EGR control unit, the unit being configured so as to control the EGR valve and the intake air valve with a simple control command signal that makes both the valves be operated in a coupled mode whereby the response performance as to the engine speed during acceleration as well as the EGR gas flow rate is enhanced by means of compensation regarding the dead zones inherent in the intake air throttle valve and the EGR valve.

This disclosure particularly aims at an EGR control unit for the internal combustion engines, whereby the EGR system can be stopped, in response to hard acceleration, within a fraction of a second from the moment of a greater EGR flow rate condition. It is hereby noted that the greater EGR flow rate condition means a condition where the EGR valve is fully opened, the intake air throttle valve is activated in a closing direction so as to decrease the inhaled fresh air, and a significant amount of EGR gas is inhaled into the engine.

In order to achieve the goals as mentioned, the present specification discloses an EGR control unit to control a diesel engine, the engine comprising:

an EGR valve by which EGR flow rate of the engine is adjusted, an intake air throttle valve by which the intake air flow rate of the engine is adjusted, and a mechanism in which the opening of the EGR valve is operated in conjunction with the opening of the air throttle valve; wherein, each of opening determining lines (characteristic curves) and as to the opening of the EGR valve and the air throttle valve has a dead zone part where a flow rate stays unchanged even the opening of the valve is increased beyond a certain opening level;

the EGR control unit is provided with a dead zone evaluating means that calculates an estimation excess air ratio $\lambda$ in consideration of the residual oxygen in the EGR gas; thereby, it is judged that at least one of the EGR valve and the air throttle valve is operated in the dead zone based on a rate of change of the calculated estimation excess air ratio $\lambda$ when the rate of change of the estimation excess air ratio $\lambda$ is smaller than a prescribed level; and the EGR control unit is provided with a dead zone compensating means that makes revisions regarding opening command signals as to the EGR valve and the intake air throttle valve so that the dead zones do not hinder the mechanism regarding the conjunct opening operation when the dead zone evaluating means judges that at least one of the EGR valve and the air throttle valve is operated in the dead zone, and the engine is under a transient response condition.

According to this invention, it is judged whether or not the valves are operated in the dead zone, by use of the rate of change as to the estimation excess air ratio $\lambda$ that is calculated in consideration of the residual air (oxygen) in the EGR gas which returns back to the intake air system from the exhaust gas system of the engine; namely, the judgment is made in consideration of not only the EGR gas flow rate but also residual air (flow rate) in the EGR gas; thus, the detection accuracy as to the flow rate change can be enhanced, and the accurate judgment as to the dead zone can be performed.

Further, the dead zone compensating means is provided, thereby the means makes the revisions as to the opening command signals as to the EGR valve and the intake air throttle valve, so that the dead zones do not hinder the mechanism regarding the conjunct opening operation, in the case when the dead zone evaluating means judges that at least one of the EGR valve and the air throttle valve is operated under a state in the dead zone; for instance, in the case where the intake air throttle valve is opening, the control command signal moves right from the point $\theta_x$ in FIG. 11, and the throttle valve is activated in an opening direction from the point $P_2$ (FIG. 11) to the full opening point; thereby, the opening of the EGR valve moves right from the point $P_1$ (FIG. 11), and continues to be fully opened in a dead zone Q (FIG. 11) for a while; thus, unless the EGR valve opening is narrowed to a certain degree, the EGR gas flow rate cannot decrease; in this way, even when the intake air throttle valve is activated toward the full opening, a sufficient amount of air cannot be quickly inhaled into the combustion chamber; as a result, there has been a difficulty that the engine suffers from insufficient response performance. According to this invention, however, the dead zone compensating means makes the revisions regarding the opening command signals as to the EGR valve, so that the EGR valve moves from the point $P_1$, without the influence of the dead zone Q; thus, the response performance is enhanced by means of the quick closing of the EGR valve, while the intake air throttle valve is opening.

Moreover, for instance, in the case where the EGR valve is opening, the control command signal moves left from the point $\theta_Y$ in FIG. 11, and the EGR valve is activated in an opening direction from the point $P_2'$ (FIG. 11) to the full opening point; thereby, the opening of the throttle valve moves left from the point $P_1'$ (FIG. 11), and continues to be fully opened in a dead zone Q (FIG. 11) for a while; thus, unless the throttle valve opening is narrowed to a certain degree, the intake air flow rate cannot decrease; in this way, even when the EGR valve is activated toward the full opening, a sufficient amount of EGR gas (a sufficient EGR rate) cannot be quickly increased; as a result, there has been a difficulty that the engine suffers from insufficient response performance. According to this invention, however, the dead zone compensating means makes the revisions regarding the opening command signals as to the intake air throttle valve, so that the throttle valve moves from the point $P_1'$, without the influence of the dead zone Q; thus, the response performance is enhanced (with a smooth streaming of EGR gas into the combustion chamber) by means of the quick closing of the intake air throttle valve, while the EGR valve is opening.

A preferable mode according to the above embodiment is the EGR control unit to control s diesel engine, the unit further comprising an EGR-and-throttle valve opening level setting means in which an EGR valve opening command signal and an air throttle valve opening command signal are generated from a simple control command signal whereby the opening command determining line for each of the valves is specified as a function of the simple control command signal; wherein, the opening determining line as to the intake air throttle valve opening command signal continues its linear upward course, as the simple control command signal increases, while the opening determining line as to the EGR valve opening command signal continues its linear downward course as the simple control command signal increases;

the upward line part of the intake air throttle valve opening command signal and the downward line part of the EGR valve opening command signal intersect each other;

in the dead zone compensating means, the opening determining line as to the intake air throttle valve opening command signal, and the opening determining line as to the EGR valve opening command signal are shifted in response to the increase or decrease of the simple control command signal, along the direction of the axis as to the simple control command signal.

According to the above preferable mode, in the dead zone compensating means, the opening determining line as to the intake air throttle valve opening command signal, and the opening determining line as to the EGR valve opening command signal are generated as the functions as to the simple control command signal; further, the opening determining lines intersect each other; and, the determining lines are shifted in response to the increase or decrease of the simple control command signal, along the direction of the axis as to the simple control command signal; thus, the influence of the dead zones as to the intake air throttle valve and the EGR valve can be removed.

A preferable variation according to the very above mode is the EGR control unit to control a diesel engine, wherein the dead zone compensating means shifts the opening determining line as to the EGR valve opening command signal in the direction in which the dead zone of the EGR valve is narrowed in response to the opening increase of the intake air throttle valve the opening which moves along the opening determining line thereof based on the order of the simple control command signal as the signal for the intake air throttle valve.

A further preferable variation in connection with the very above variation is the EGR control unit to control a diesel engine, wherein the dead zone compensating means shifts the opening determining line as to the EGR valve opening command signal back to the original position where the dead zone as to the EGR valve is not narrowed, after the simple control command signal as the signal for the intake air throttle valve reaches a point where the downward line part as to the EGR valve opening determining line the dead zone of which is narrowed intersects with the horizontal axis as to the simple control command signal, as well as after the simple control command signal as the signal for the intake air throttle valve passes through the point in an increasing direction.

Figure 3:
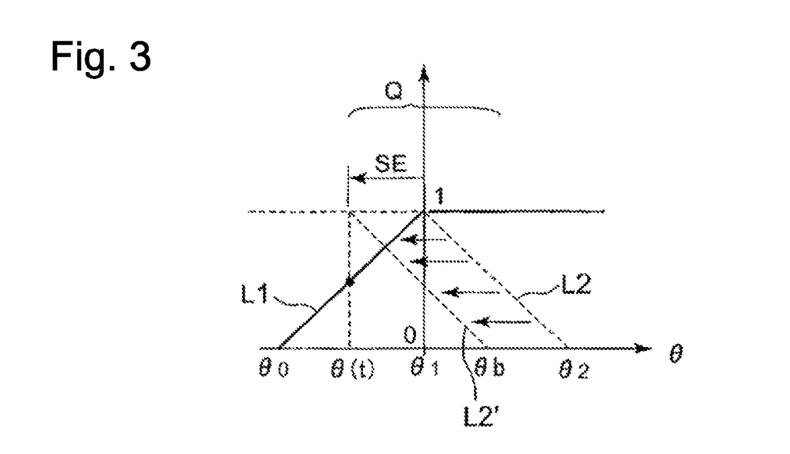
FIG. 3 shows the shift procedure as to the EGR valve opening control command line.

According to the above preferable variations, the opening determining line as to the EGR valve opening command signal is shifted left by the amount SE as depicted in FIG. 3 thereby the dotted line shows the revised determining line as to the EGR valve; according to the control order based on this revised line, the EGR valve opening movement can be free from the influence of the dead zone Q; therefore, the EGR valve can hasten the closing commencement of its own, without the effect of the dead zone. In this way, the closing movement of the EGR valve is hastened so that the air flow through the air throttle valve can be performed smoothly; as a result, the engine speed response during the intake air throttle valve opening can be enhanced.

If the EGR valve opening turns into a decreasing pattern from an increasing pattern in the case where the EGR valve is fully closed as the simple control command signal increases after the opening determining line as to the EGR valve opening command signal is shifted so that the dead zone of the EGR valve opening determining line is narrowed, then it is required that the EGR valve opening be increased; however, in the mentioned case where the simple control command signal is about to decrease in the zone of $\theta \geq \theta_b$ in FIG. 3, and the EGR opening command level stays null; as a result, a problem is caused that the EGR valve will not open, even though the valve is required to open.

Figure 4:
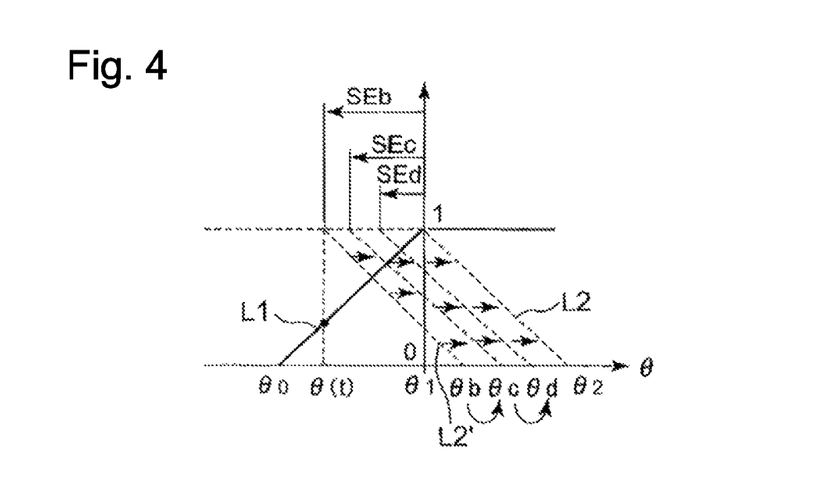
FIG. 4 shows the return shift procedure as to the EGR valve opening control command line.

According to the later variation as described above, this problem can be solved. The reason is as follows. In the above mentioned case where the simple control command signal $\theta$ becomes greater than or equal to $\theta_b$, the EGR valve opening determining line returns back toward the original position (see FIG. 4) in response to the value of the simple control command signal. In other words, when the simple control command signal $\theta$ exists on the horizontal axis in FIG. 4, over the points $\theta_b$, for example, on the points $\theta_c$, $\theta_d$ . . . , in sequence, then the EGR valve opening determining line returns back toward the original position in response to the movement of the simple control command signal $\theta$ as shown in FIG. 4; thus, even when the EGR valve opening turns to a decreasing pattern from an increasing pattern, the EGR valve can be opened immediately. Therefore, the response performance as to the EGR rate (the EGR gas flow rate) is enhanced and the exhaust gas emission characteristics are improved.

A preferable variation according to the before-described mode is the EGR control unit to control a diesel engine, wherein the dead zone compensating means shifts the opening determining line as to the intake air throttle valve opening command signal in the direction in which the dead zone of the intake air throttle valve is narrowed in response to the opening increase of the EGR valve the opening which moves along the opening determining line thereof based on the order of the simple control command signal as the signal for the EGR valve.

A further preferable variation in connection with the very above variation is the EGR control unit to control a diesel engine, wherein the dead zone compensating means shifts the opening determining line as to the intake air throttle valve opening command signal back to the original position where the dead zone as to the intake air throttle valve is not narrowed, after the simple control command signal as the signal for the intake air throttle valve reaches a point where the upward line part as to the intake air throttle valve opening determining line the dead zone of which is narrowed intersects with the horizontal axis as to the simple control command signal, as well as after the simple control command signal as the signal for the intake air throttle valve passes through the point in a decreasing direction.

Figure 5:
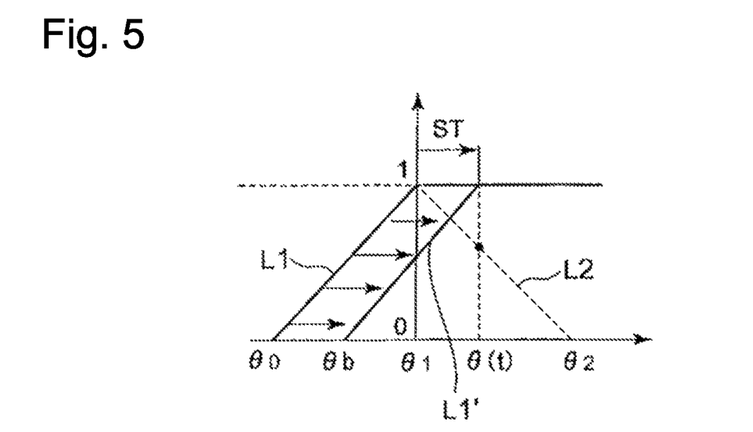
FIG. 5 shows the shift procedure as to the intake air throttle valve opening control command line.

According to the above preferable variations, the opening determining line as to the intake air throttle valve opening command signal is shifted right by the amount ST as depicted in FIG. 5 thereby the solid line shows the revised determining line as to the intake air throttle valve; according to the control order based on this revised line, the intake air throttle valve opening movement can be free from the influence of the dead zone Q; therefore, the intake air throttle valve can hasten the closing commencement of its own, without the effect of the dead zone. In this way, the closing movement of the intake air throttle valve is hastened so that the EGR gas flow into the combustion chamber can be performed smoothly; as a result, the engine speed response as to the EGR rate (the EGR gas flow rate) can be enhanced.

Figure 6:
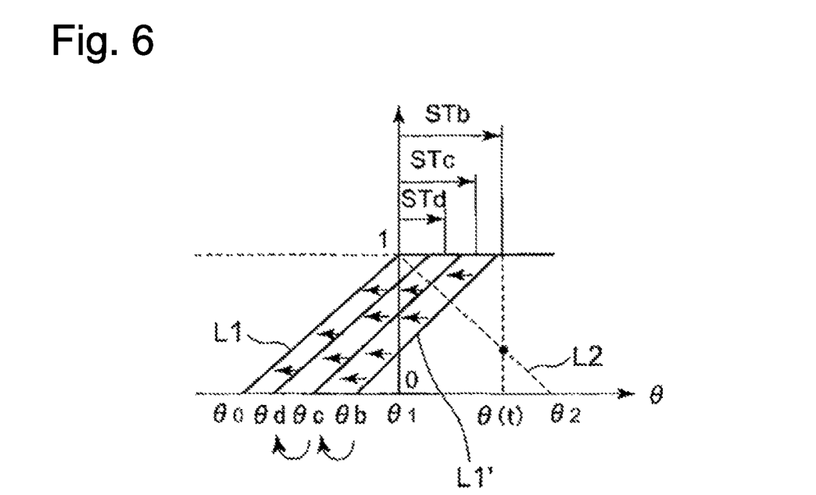
FIG. 6 shows the return shift procedure as to the intake air throttle valve opening control command line.

If the intake air throttle valve opening turns into an increasing pattern from a decreasing pattern in the case where the intake air throttle valve is fully closed as the simple control command signal decreases after the opening determining line as to the intake air throttle valve opening command signal is shifted so that the dead zone of the intake air throttle valve opening determining line is narrowed, then it is required that the intake air throttle valve opening be increased; however, in the mentioned case where the simple control command signal is about to increase in the zone of $\theta \leq \theta_b$ in FIG. 6, and the intake air throttle opening command level stays null; as a result, a problem is caused that the intake air throttle valve will not open, even though the valve is required to open.

According to the later variation regarding the intake air throttle valve as described above, this problem can be solved. The reason is as follows.

In the above mentioned case where the simple control command signal $\theta$ becomes smaller than or equal to $\theta_b$, the intake air throttle valve opening determining line returns back toward the original position (see FIG. 6) in response to the value of the simple control command signal. In other words, when the simple control command signal $\theta$ exists on the horizontal axis in FIG. 6, below the points $\theta_b$, for example, on the points $\theta_c$, $\theta_d$ . . . , in sequence, then the intake air throttle valve opening determining line returns back toward the original position in response to the movement of the simple control command signal $\theta$ as shown in FIG. 6; thus, even when the intake air throttle valve opening turns to an increasing pattern from a decreasing pattern, the intake air throttle valve can be opened immediately. Therefore, the response performance as to the intake air throttle valve opening and the engine acceleration performance are enhanced.

A preferable mode according to the before described embodiment is the EGR control unit to control a diesel engine, the unit being provided with an oxygen concentration meter at the air or gas passage at the down stream side of the confluence as to the EGR passage and the intake air passage, wherein the dead zone evaluating means by use of the calculated estimation excess air ratio is replaced with a dead zone evaluating means that judges whether or not at least one of the intake air throttle valve and the EGR valve is operated in the dead zone based on not the calculated estimation excess air ratio but the oxygen concentration detected by the oxygen concentration meter.

According to the above mode of the invention, the oxygen concentration of the air or gas inhaled into the combustion chamber is detected by the oxygen concentration meter that is provided at the inlet manifold that is the air or gas passage at the downstream side of the confluence as to the EGR passage and the intake air passage; further, on the basis of the rate of change of the oxygen concentration, it is judged whether the valves are operated in their dead zones or not; namely, the judgment is not based on the change in the air/gas flow that streams into the combustion chamber, but based on the rate of change of the detected oxygen concentration of the air/gas flow. Therefore, an accurate judgment can be achieved.

Further, in making the above described judgment, only the signals from the oxygen concentration meter is employed; thus, the valve opening control can be simplified in comparison with the manner in which the inhaled air/gas pressure and temperature are detected so that the estimation excess air ratio $\lambda_s$ is calculated through the predetermined formulae.

According to the present invention, an EGR control unit to control a diesel engine can be provided, the unit being configured so as to control the EGR valve and the intake air valve with a simple control command signal that makes both the valves be operated in a coupled mode whereby the response performance as to the engine speed during acceleration as well as the EGR gas flow rate is enhanced by means of compensation regarding the dead zones inherent in the intake air throttle valve and the EGR valve.

The present invention, in particular, can provide an EGR control unit for the internal combustion engines, whereby the EGR system can be stopped, in response to hard acceleration, within a fraction of a second from the moment of a greater EGR flow rate condition. It is hereby noted again that the greater EGR flow rate condition means a condition where the EGR valve is fully opened, the intake air throttle valve is activated in a closing direction so as to decrease the inhaled fresh air, and a significant amount of EGR gas is inhaled into the engine.

DETAILED DESCRIPTION OF THE PREFERRED EMBODIMENTS

Hereafter, the present invention will be described in detail in consultation with the embodiments shown in the figures. However, the dimensions, materials, shape, the relative placement and so on of a component described in these embodiments shall not be construed as limiting the scope of the invention thereto, unless especially specific mention is made.

Figure 1:
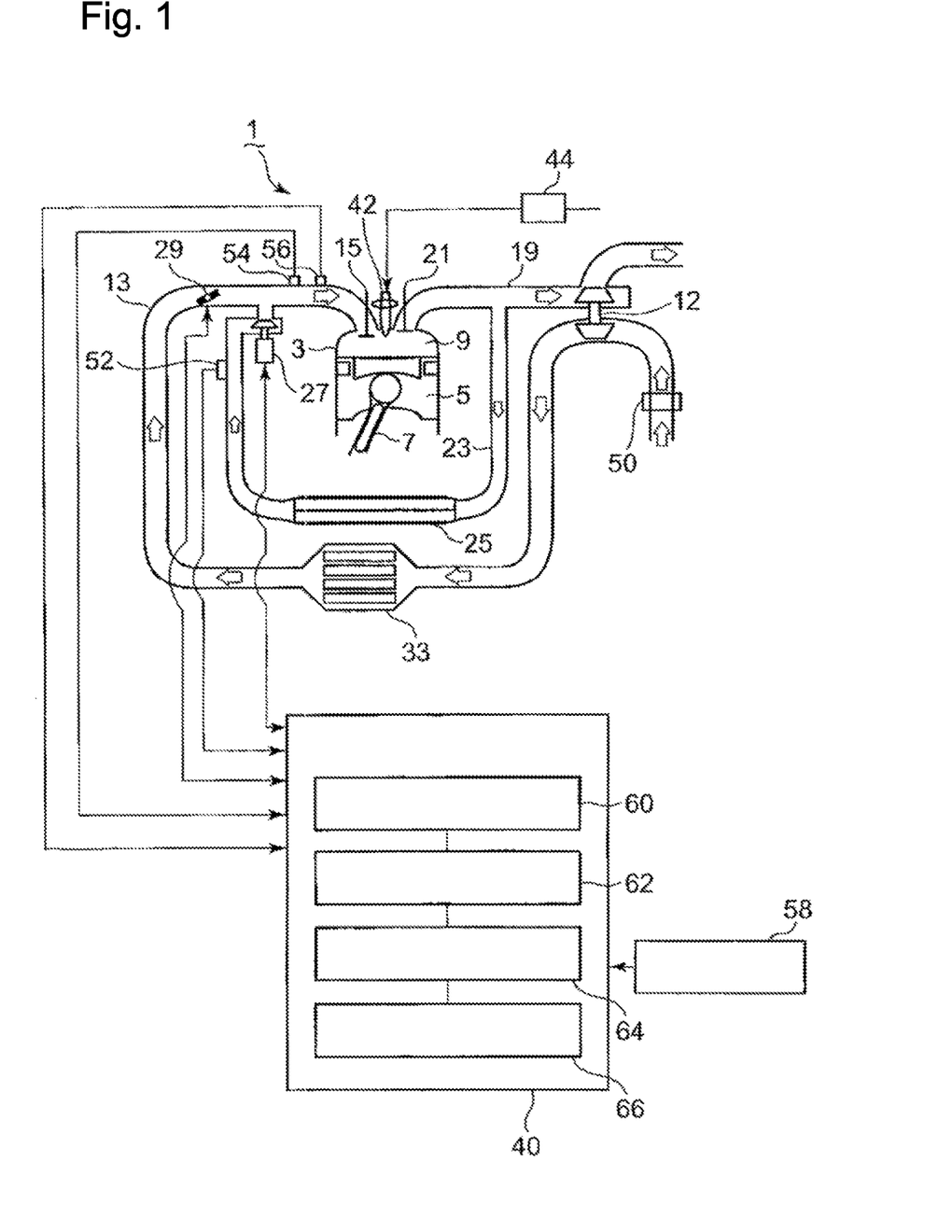
FIG. 1 shows the whole configuration of an EGR (Exhaust Gas Re-circulation) control unit for a diesel engine according to embodiment of the present invention.

FIG. 1 shows the whole configuration of an Exhaust Gas Re-circulation control unit for a diesel engine according to the first embodiment of the present invention. As depicted in FIG. 1, a diesel engine 1 of a four stroke cycle is provided with a piston 5 that performs a reciprocating motion in a cylinder 3 so that the piston outer periphery slides on the inner wall of the cylinder; the engine is also provided with a crankshaft (not shown) connected to the piston 5 via a connecting rod 7 through which the reciprocating motion of the piston 5 is converted into a rotational movement of the crankshaft.

In the engine 1, a combustion chamber 9 is formed over the top surface of the piston 5 and within the inner surface of the cylinder; an intake air passage 13 is connected to the combustion chamber 9 via an intake air (gas) port that is opened and closed by an intake valve 15. Further, an exhaust gas passage 19 is connected to the combustion chamber 9 via an exhaust gas port that is opened and closed by an exhaust valve 21.

On a part way of the exhaust gas passage 19, an EGR (Exhaust Gas Re-circulation) passage 23 is branched so that the passage 23 merges with the intake air passage 13 at the down stream side of an intake air throttle valve 29; thereby, on the passage 23, an EGR cooler 25 that cools the EGR gas streaming through the passage 23 is provided; also, on the passage at the down stream side of the EGR cooler 25, an EGR valve 27 that regulates the flow rate of the EGR gas is provided.

The engine 1 is provided with an exhaust gas turbocharger 12 a compressor of which pressurizes the ambient air and sends the pressurized air to an inter-cooler 33 through the intake air passage 13; the pressurized air cooled by the inter-cooler is inhaled into the engine (i.e. the combustion chamber 9) through the intake air passage 13.

The opening level of the intake air throttle valve 29 is controlled so as to regulate the flow rate of the intake air inhaled into the combustion chamber 9. In the case of diesel engines, the throttle valve 29 is usually kept in its full opening condition; and, the opening of the air throttle valve is operated in the direction that closes the valve 29 when an EGR control is performed. The opening level of the intake air throttle valve 29, as well as that of the EGR valve 27, is controlled by an exhaust gas re-circulation control unit 40, as described later.

The combustion chamber 9 is provided with a fuel injection valve 42 installed in each cylinder of the engine 1 so that the fuel injection valve can inject a fuel pressurized by a fuel injection pump (not shown) into the combustion chamber 9; the fuel injection quantity per shot and the injection timing of the fuel are controlled by a fuel control unit 44.

An air flow meter 50 that measures the flow rate of the fresh intake air which is inhaled into the combustion chamber 9 through the intake air passage 13 is fitted on a part way of the intake air passage 13, upstream to the compressor of the turbocharger 12; from the air flow meter 50, the signals as to the flow-rate of the fresh air are inputted into the EGR (exhaust gas re-circulation) control unit 40. Similarly, an EGR gas flow meter 52 that measures the (volume) flow rate of the EGR gas which streams into the intake air passage 13 through the EGR gas passage 23 is fitted on a part way of the EGR gas passage 23, upstream to the EGR valve 27.

Further, the engine is provided with an inlet manifold pressure sensor 54 that detects a pressure in an inlet manifold of the engine as well as an inlet manifold temperature sensor 56 that detects a temperature in the inlet manifold, and an engine speed sensor 58 that detects the engine speed of the engine; from the sensors 54 56 and 58, pressure signals, temperature signals, and engine speed signals are inputted into the EGR (exhaust gas re-circulation) control unit 40.

In the next place, the EGR (exhaust gas re-circulation) control unit 40 is now explained. The EGR (exhaust gas re-circulation) control unit 40 comprises an EGR-and-throttle valve opening level setting means 60, an estimation excess air ratio λ computing means 62, a dead zone evaluating means 64, a dead zone compensating means 66.

In the EGR-and-throttle valve opening level setting means 60, from a simple control command signal θ as a parameter, an EGR valve opening command signal and an intake air throttle valve opening command signal are generated, whereby the opening of the EGR valve 27 is operated in conjunction with the opening of the intake air throttle valve 29; in generating the EGR valve opening command signal and an intake air throttle valve opening command signal, opening command determining lines (functions) are introduced; in other words, two functions are used so that one converts the simple control command signal θ into the EGR valve opening command signal, while the other converts the simple control command signal θ into the intake air throttle valve opening command signal.

As is the case in FIG. 12 that explains a conventional technology, the control command signal θ is a command signal that is outputted from the EGR (exhaust gas re-circulation) control unit in response to the operation condition of the engine just like control command signals that are generated when a feed back control is applied to the actual air flow rate to meet the target air flow rate which is calculated based on the engine speed and the fuel flow rate (the fuel injection quantity).

Figure 2:
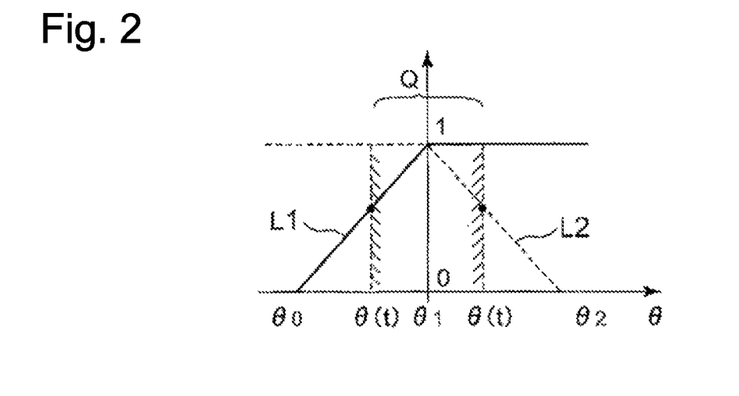
FIG. 2 shows the basic characteristic control command lines as to the intake air throttle valve opening and the EGR valve opening.

Further, FIG. 2 shows an opening determining line (a function) L1 as to the air throttle valve opening command signal as well as an opening determining line (a function) L2 as to the EGR valve opening command signal; FIG. 2 also depicts the relation between the opening determining lines L1 and L2 which are regarded as a basic line as to the valve opening of the present invention.

In FIG. 2, the lateral axis and the vertical axis denote the control command signal θ and the valve opening level respectively; on the vertical axis, the numerals 1 (100%) and 0 (0%) correspond to the fully opened and closed states respectively. As depicted with a solid line in FIG. 2, the opening determining line (a function) L1 as to the air throttle valve opening command signal continues its linear upward course (i.e. the opening increases), as the parameter (the control command signal) θ increases from $\theta_0$ to $\theta_1$; at $\theta=\theta_1$, the air throttle valve is in the fully opened state; when $\theta \geq \theta_1$, the fully opened state continues. On the other hand, the opening determining line (a function) L2 as to the EGR valve opening command signal is in a flat level that corresponds to the fully opened state, as the parameter (the control command signal) θ increases from $\theta_0$ to $\theta_1$; when $\theta \geq \theta_1$, the line L2 as to the EGR valve opening command signal continues its linear downward course (i.e. the opening decreases), as the parameter (the control command signal) θ increases over $\theta_1$; at $\theta=\theta_2$, the air throttle valve is in the fully closed state; when $\theta \geq \theta_2$, the fully closed state continues.

As FIG. 2 shows, each of the opening determining lines (functions) L1 and L2 as to the opening of the EGR valve 27 and the intake air throttle valve 29 has a dead zone part where the flow rate stays unchanged even when the opening of the valve is increased beyond a certain opening level.

In order to detect the dead zone, the dead zone evaluating means 64 calculates the estimation excess air ratio λ including the residual air (not-used air [oxygen] in combustion) in the EGR gas. Based on the rate of change of the calculated estimation excess air ratio λ, when the rate of change of the estimation excess air ratio λ, is smaller than a prescribed level, it is judged that at least one of the EGR valve 27 and the intake air throttle valve 29 is under a state of the dead zone.

The calculation of the estimation excess air ratio λ is performed by the estimation excess air ratio λ computing means 62, by use of the following formulae:

$$\lambda = \frac{G_a + G_{egra}}{G_f \cdot L_{th}} \quad (1)$$

$$G_{egra} = \frac{G_{egr}(\lambda n - 1) - 1) \cdot G_f \cdot L_{th}}{G_a + G_f + G_{egr}} \quad (2)$$

whereby,
$G_a$ is an intake air mass flow rate;
$G_{e\,g\,r}$ is an EGR gas mass flow rate;
$G_{e\,g\,r\,a}$ is an air mass flow rate in the EGR gas flow rate;
$G_f$ is a fuel mass quantity injected per shot;
$L_{t\,h}$ is the theoretical air-fuel ratio; and
(n−1) is an index that refers to the former calculation result as to the former data sampling cycle.

The intake air mass flow rate $G_a$ in the formula (1) is calculated by use of a detected signal from the air flow meter 50; the EGR gas mass flow rate $G_{e\,g\,r}$ is calculated through numerical computations based on the EGR gas volume flow rate detected by the EGR gas flow meter 52 or an measurement as to the pressure drop of the EGR gas through the EGR cooler 25. Hereby, it is noted that the device as to the pressure drop measurement is not shown in the attached drawings.

The air mass flow rate $G_{e\,g\,r\,a}$ in the EGR gas flow rate is estimated by use of a calculation result, the estimation excess air ratio λ (n−1), obtained from an arithmetic processing of the former data sampling using the formula (2).

In the dead zone evaluating means 64, the differential coefficient of the λ with respect to the θ, namely, dλ/dθ is calculated; when the value of dλ/dθ is smaller than a prescribed value α, it is judged that at least one of the EGR valve 27 and the intake air throttle valve 29 is under a state of the dead zone In the EGR (exhaust gas re-circulation) control unit as described above, whether or not the valve opening levels as to the EGR valve and the air throttle valve are in the dead zone is evaluated by use of the rate of change of the estimation excess air ratio λ which is calculated in consideration of the residual air (not-used air [oxygen] in combustion) in the EGR gas that returns to the intake air system from the exhaust gas system; further, not only the EGR gas flow rate but also the residual air (oxygen) is taken into consideration in the calculation; therefore, whether in the dead zone or not can be accurately estimated due to the enhanced flow rate detection.

Figure 7:
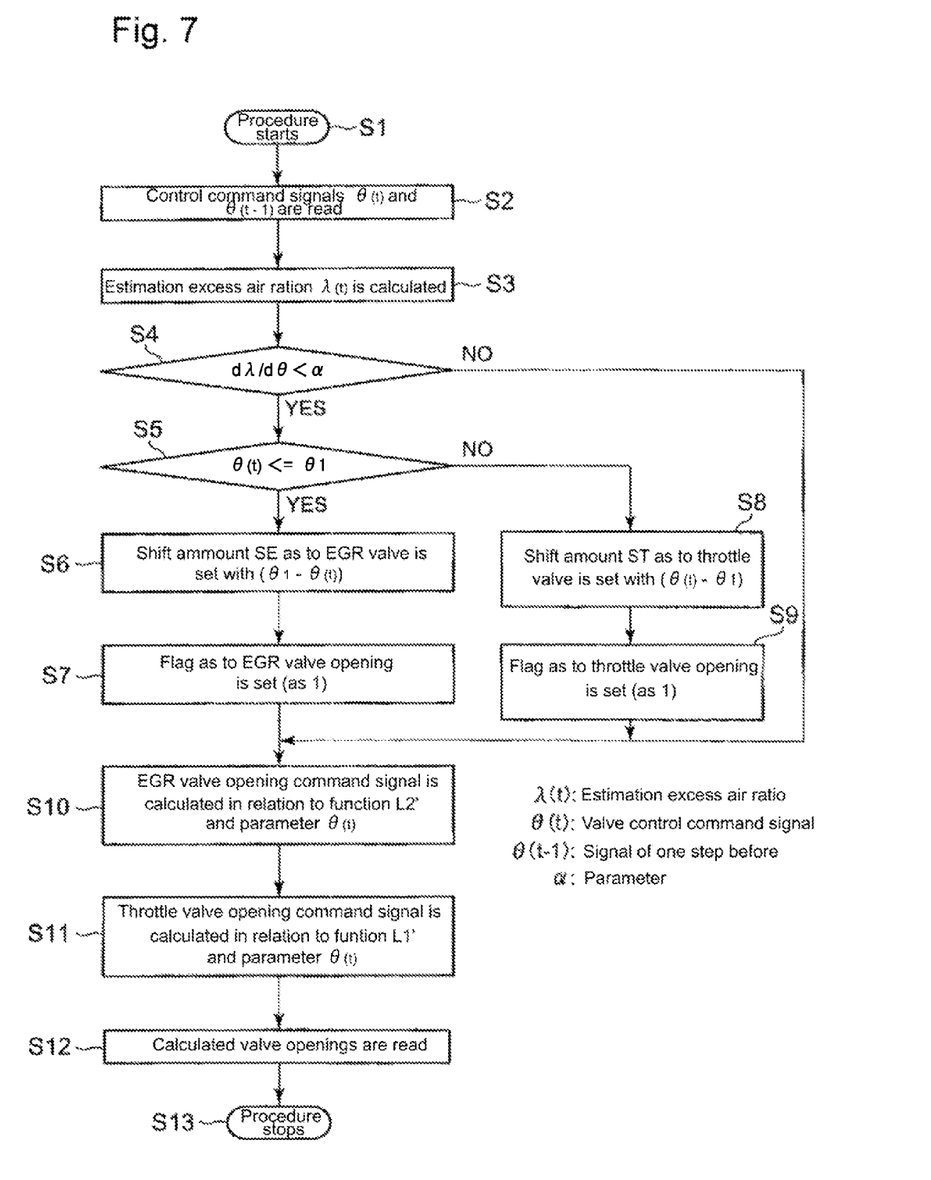
FIG. 7 shows a main control flow chart as to the shift procedure of the EGR valve opening control command line and the intake air throttle valve opening control command line.

The above explanation as to the dead zone evaluating means 64 is now followed by the explanation as to a dead zone compensating means 66 in consultation with the flow chart of FIG. 7.

In Step S1, the chain of processes is started; in Step S2, the control command signal θ(t), and θ(t−1) are read, whereby θ(t) denotes the current valve control command signal and θ(t−1) denotes the valve control command signal in the former calculation step of one operation (or sampling) cycle before.

In Step S3, the estimation excess air ratio λ is calculated by the estimation excess air ratio λ computing means 62, on the basis of the formula (1). In Step S4, whether or not the differential coefficient of the λ with respect to the θ, namely, the above described dλ/dθ is smaller than the above described prescribed value α is judged.

In Step S4, if the estimation result is YES, then Step S4 is followed by Step S5 in which whether the above θ(t) is less than or equal to the $θ_1$ of FIG. 2 or not is judged; if the above estimation result is NO, then Step S10 follows Step S4.

In Step S5, when it is estimated that θ(t) is less than or equal to $θ_1$, then Step 5 is followed by Step S6 in which the amount $(θ_1−θ(t))$ is established as an amount SE (see FIG. 3) of the shift with respect to the line L2 (see FIG. 2); and, in Step S7, a flag 1 is set as a flag FE with respect to the line L2. It is noted that the line L2 is the opening determining line (a function) L2 as to the EGR valve opening command signal, as already described.

In other words, when θ=θ(t) in FIG. 2, it is estimated that the EGR valve is being in a dead zone (since the air throttle valve is on a part way toward the full opening state, namely, θ(t) is increasing); thereby, the opening of the air throttle valve does not reach the full opening condition of its own; yet, the line L2 as to the EGR valve opening command signal is shifted in the arrow direction (see FIG. 3), by the amount SE=$(θ_1−θ(t))$, so that the dead zone effect by which the λ cannot vary can be removed.

In the above manner, as shown in FIG. 3, the EGR valve begins to close at θ=θ(t) which is before θ reaches $θ_1$. Thus, the closing timing of the EGR valve 27 can be advanced; therefore, the EGR valve 27 can hasten the closing commencement of its own without the effect of the dead zone of the L2 (as to the EGR valve opening command signal). In this way, the closing movement of the EGR valve is hastened so that the air flow through the intake air throttle valve 29 can be performed smoothly; as a result, the engine speed response during the sharp increasing of θ(t) (namely, during hard acceleration) can be enhanced.

On the other hand, in Step S5, if it is judged that θ(t) exceeds $θ_1$, then Step S5 is followed by Step S8 where the amount $(θ_1−θ(t))$ is established as an amount ST (see FIG. 5) of the shift movement with respect to the line L1 (see FIG. 5); and, in the following Step S9, a flag 1 is set as a flag FT with respect to the line L1. It is noted that the line L1 is the opening determining line (a function) L1 as to the (intake) air throttle valve opening command signal, as already described.

In other words, when θ=θ(t) [the right side θ(t)] in FIG. 2, it is estimated that the intake air throttle valve 29 is being in the dead zone (since the EGR valve is on the way toward the full opening state [toward left in FIG. 2], namely, θ(t) is decreasing); thereby, the opening of the EGR valve does not reach the full opening condition; yet, the line L1 as to the air throttle valve opening command signal is shifted in the arrow direction (see FIG. 5), by the amount ST=$(θ_1−θ(t))$, so that the dead zone effect by which the λ cannot vary can be removed.

In the above manner, as shown in FIG. 5, the intake air throttle valve 29 begin to close at θ=θ(t) which is before θ reaches $θ_1$; hereby it is noted that θ(t) is now moving on the right half of the horizontal axis, toward left. Thus, the closing timing of the intake air throttle valve 29 can be advanced; therefore, the air throttle valve can hasten the closing commencement of its own without the effect of the dead zone of the L1 (as to the air throttle valve opening command signal). In this way, the closing movement of the air throttle valve is hastened so that the EGR gas flow into the combustion chamber can be performed smoothly; as a result, the response as to the EGR rate or the EGR gas flow can be enhanced.

Next, in Step S10, the command signal level as to the EGR valve opening is calculated in response to the control command signal θ on the basis of the line L2' (see FIG. 3); thereby the line L2' is defined as the line which is obtained by the above described shift of the opening determining line (a function) L2 as to the EGR valve opening command signal. Further, in Step S11, the command signal level as to the air throttle valve opening is calculated in response to the control command signal θ, on the basis of the line L1' (see FIG. 5); thereby the line L1' is defined as the line which is obtained by the above described shift of the opening determining line (a function) L1 as to the air throttle valve opening command signal. In next Step 12, the calculated command signal levels are memorized so as to use as the control command signal for the EGR and air throttle valves. In Step 13, the chain of processes finishes.

As depicted in FIG. 3, in the case where θ(t) is increasing, if the opening determining line L2 as to the EGR valve opening command signal is shifted and the operation of the EGR valve 27 is advanced, then the EGR valve is fully closed (the opening=0) before θ(t) reaches $θ_2$. Supposing that θ(t) is equal to $θ_b$ when the EGR valve is fully closed, then the EGR valve opening has to be in a state where the opening cannot be increased, under the condition that θ(t) is greater than or equal to $θ_b$; in this occasion, unless θ(t) becomes less than $θ_b$, the EGR valve opening cannot be opened. Thus, in the case where θ(t) turns to a decreasing pattern, the EGR valve control command line L2' is returned to the standard line L2, in the present invention. This procedure is called a return-back procedure in this specification.

Figure 8:
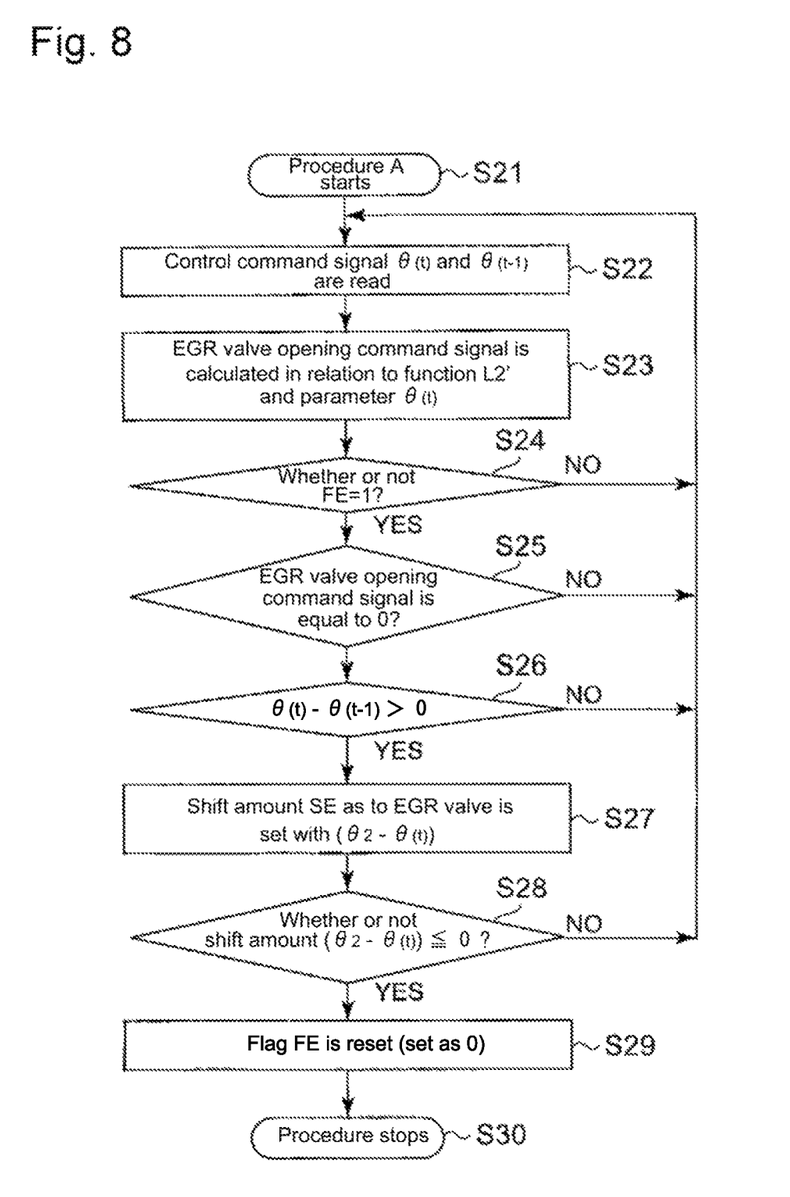
FIG. 8 shows a control flow chart as to the shift procedure of the EGR valve opening control command line.

The above return-back procedure is mentioned as Procedure A in FIG. 8, and is now explained in consultation with FIG. 4 and the flowchart in FIG. 8.

In FIG. 8, after a series of processes start at Step S21, the control command signals θ(t) and θ(t−1) are read in Step S22; in Step S23, the command opening level as to the EGR valve is calculated based on θ(t) and the line L2' that is what the line L2 has been shifted to.

In the following step S24, it is judged whether the flag FE as to the EGR valve opening command line is 1 or not, and if FE=1 (in the case where the line shift [L2 to L2'] has been performed, and the flag FE is set in Step 7 of FIG. 7), Step S24 is followed by Step S25. In Step S25, it is judged whether or not the EGR valve opening command level is 0 (fully closed). If the level is 0 (fully closed), then Step S25 is followed by Step S26. In Step S26, it is judged whether or not the value (θ(t)−θ(t−1)) is positive; if the value is positive, then it is estimated that the control command signals θ(t) is increasing. If the value (θ(t)−θ(t−1)) is increasing, Step S26 is followed by Step S27 in which the shift amount SE as to the EGR valve opening command line is re-established with a value $(θ_2−θ(t−1))$. In the following step S28, it is judged whether or not the shift amount SE that is equal to $(θ_2−θ(t))$ is not-positive; namely, it is judged whether θ(t) reaches $θ_2$ or not; if SE dose not reach $θ_2$, a return to Step 22 is performed (continued) while SE dose not reach $θ_2$; thus, the iterative calculations as to the determination of the shift amount SE are repeated every computing cycle (every import as to θ(t) or θ(t−1)). When θ(t) finally reaches $θ_2$, Step S28 is followed by Step S29 in which the flag FE as to the EGR valve opening command line is cleared to zero. In Step S30, the series of processes finish.

The detailed situation regarding the above-described procedure A is explained in consultation with FIG. 4.

The shift amount SE ($=\theta_2-\theta(t)$) as to the EGR valve opening command line is repeatedly calculated in every computing cycle; the amount SE varies from SEb toward SEc, SEd, . . . ; thus, the line L2' after the shift completion returns back to the standard line L2; thereby, the line foot point $\theta_b$ where the EGR valve opening becomes null moves right, passing through the points such as $\theta_c$ and $\theta_d$; thus the line L2' moves right as $\theta(t)$ moves right. Therefore, even if the $\theta(t)$ movement turns into the left direction (namely, into a reducing direction), there is no apprehension that the EGR valve cannot be opened sufficiently and immediately. Thus, the opening and closing responsiveness of the EGR valve can be achieved. As a result, a low emission performance as to the engine can be achieved.

The concept of the above-described procedure A as to the EGR valve opening is applied to a procedure B as to the intake air throttle valve 29. The procedure B is now explained in consultation with FIG. 6 and the flowchart in FIG. 9.

As depicted in FIG. 6, in the case where $\theta(t)$ is decreasing, if the opening determining line L1 as to the intake air throttle valve opening command signal is shifted and the operation of the intake air throttle valve 29 is advanced, then the intake air throttle valve 29 is fully closed (the opening=0) before $\theta(t)$ reaches $\theta_0$.

Supposing that $\theta(t)$ is equal to $\theta_b$ when the intake air throttle valve 29 is fully closed, then the air throttle valve opening has to be in a state where the opening cannot be increased, under the condition that $\theta(t)$ is smaller than or equal to $\theta_b$; in this occasion, unless $\theta(t)$ exceeds $\theta_b$, the air throttle valve opening cannot be opened. Thus, in the case where $\theta(t)$ turns to an increasing pattern, the air throttle valve control command line L1' is returned to the standard line L1, in the present invention. This procedure is also called a return-back procedure in this specification.

Figure 9:
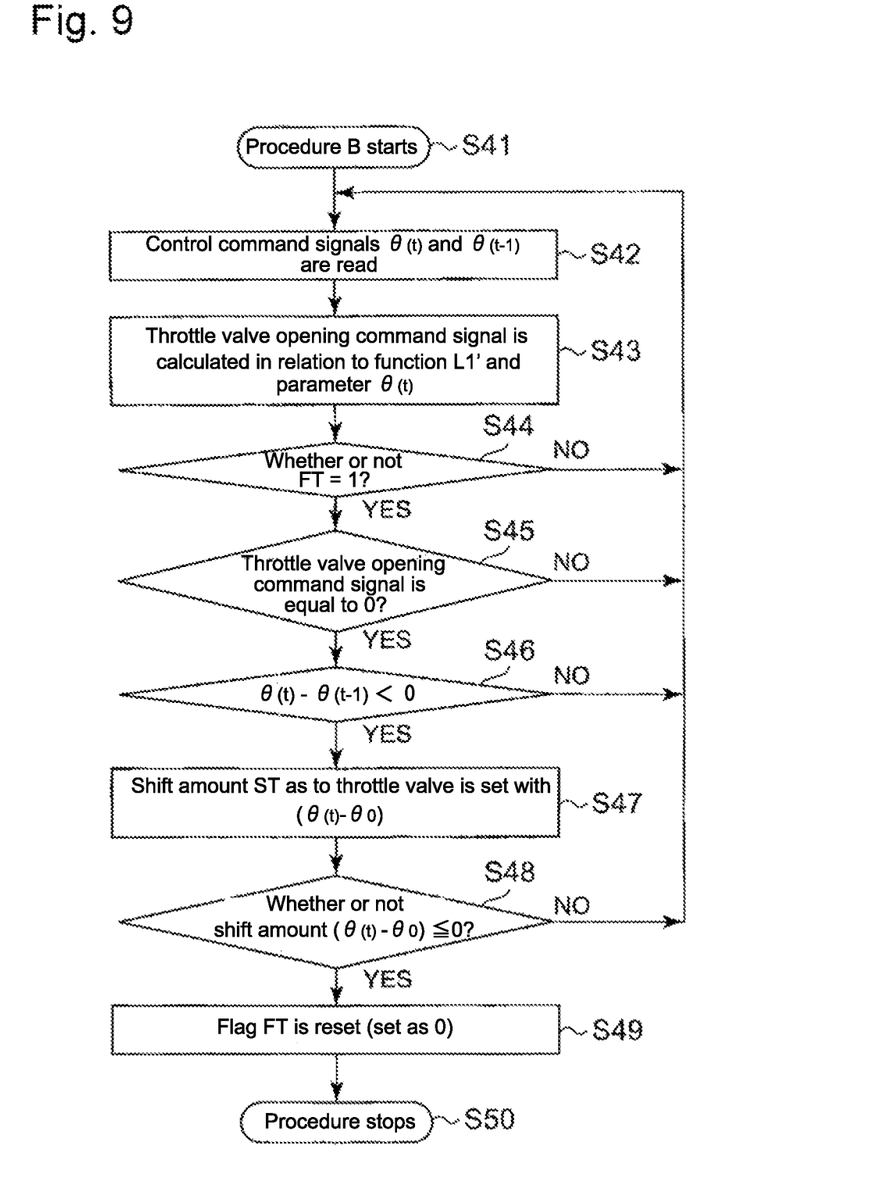
FIG. 9 shows a control flow chart as to the shift procedure of the intake air throttle valve opening control command line.

In FIG. 9, after a series of processes start at Step S41, the control command signals $\theta(t)$ and $\theta(t-1)$ are read in Step S42; in Step S43, the command opening level as to the intake air throttle valve 29 is calculated based on $\theta(t)$ and the line L1' that is what the line L1 has been shifted to.

In the following step S44, it is judged whether the flag FT as to the air throttle valve opening command line is 1 or not, and if FT=1 (in the case where the line shift [L1 to L1'] has been performed, and the flag FT is set in Step 9 of FIG. 7), Step S44 is followed by Step S45. In Step S45, it is judged whether or not the air throttle valve opening command level is 0 (fully closed), and if the level is 0 (fully closed), then Step S45 is followed by Step S46. In Step S46, it is judged whether or not the value ($\theta(t)-\theta(t-1)$) is negative, and if the value is negative, then it is estimated that the control command signals $\theta(t)$ is decreasing. If the value ($\theta(t)-\theta(t-1)$) is decreasing, Step S46 is followed by Step S47 in which the shift amount ST as to the throttle valve opening command line is re-established with a value ($\theta(t)-\theta_0$).

In the following step S48, it is judged whether or not the shift amount ST that is equal to ($\theta(t)-\theta_0$) is not-positive; namely, it is judged whether $\theta(t)$ reaches $\theta_0$ or not. If SE dose not reach $\theta_0$, a return to Step 42 is performed (continued) while ST dose not reach $\theta_0$. Thus, the iterative calculations as to the determination of the shift amount ST are repeated every computing cycle (every import as to $\theta(t)$ or $\theta(t-1)$). When $\theta(t)$ finally reaches $\theta_0$, Step S48 is followed by Step S49 in which the flag FT as to the air throttle valve opening command line is cleared to zero. In Step S50, the series of processes finish.

The detailed situation regarding the above-described procedure B is explained in consultation with FIG. 6. The shift amount ST ($=\theta(t)-\theta_0$) as to the air throttle valve opening command line is repeatedly calculated in every computing cycle. The amount ST varies from STb toward STc, STd, . . . , thus, the line L1' after the shift completion returns back to the standard line L1, thereby, the line foot point $\theta_b$ where the throttle valve opening becomes null moves right, passing through the points such as $\theta_c$ and $\theta_d$; thus the line L2' moves right as $\theta(t)$ moves right. Therefore, even if the $\theta(t)$ movement turns into the left direction (namely, into a increasing direction), there is no apprehension that the throttle valve cannot be opened sufficiently and immediately. Thus, the opening and closing responsiveness of the throttle valve can be achieved. As a result, a low emission performance as to the engine can be achieved.

Figure 10:
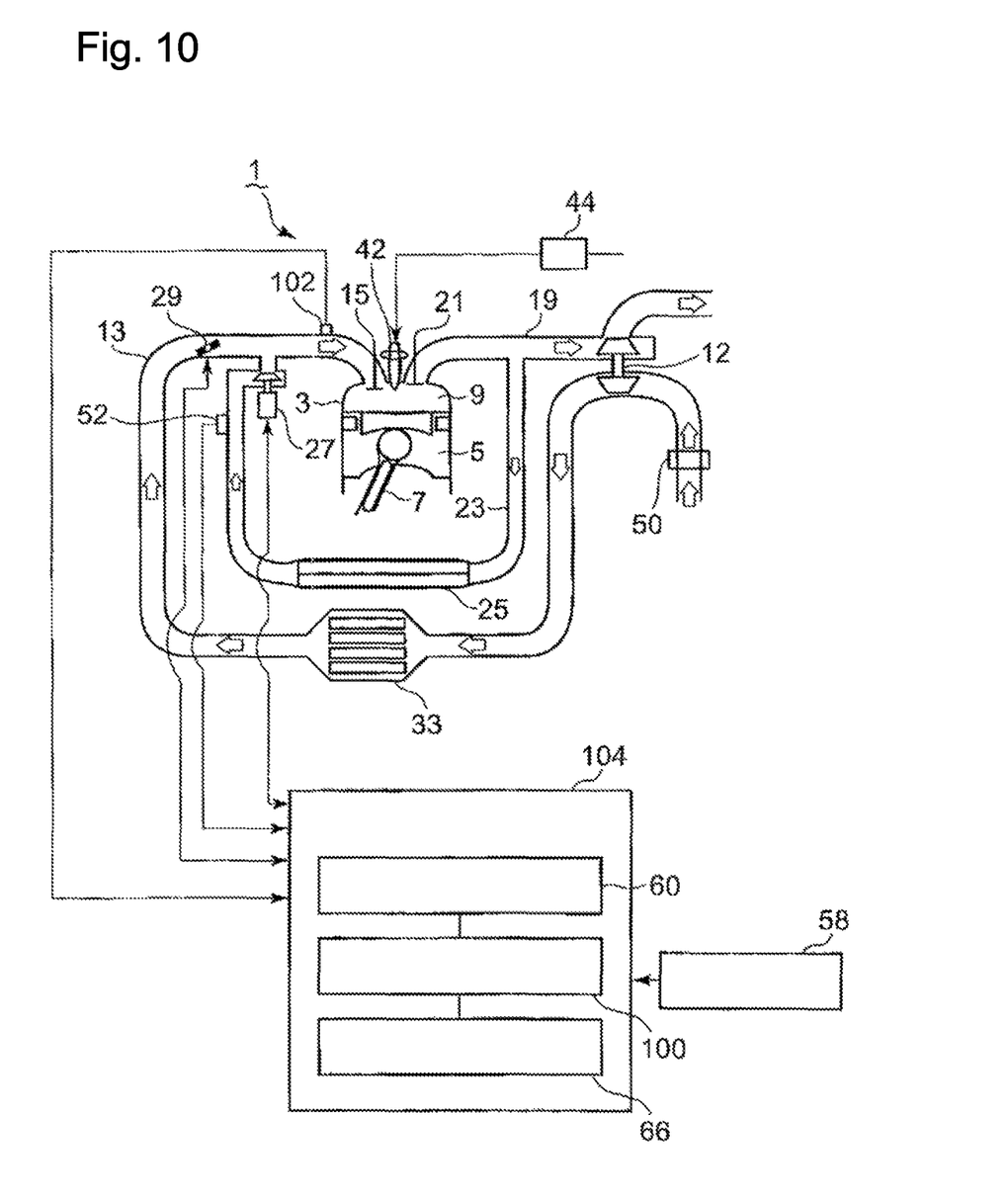
FIG. 10 shows the whole configuration of another variation as to the dead zone evaluating means.

Hereafter, another embodiment in connection with the dead zone evaluating means 64 is now explained. As described before, in the dead zone evaluating means 64, the estimation excess air ratio $\lambda$ is calculated and the differential coefficient of the $\lambda$ with respect to the $\theta$, namely, $d\lambda/d\theta$ is also calculated. In other words, when the rate of change of the estimation excess air ratio $\lambda$ is smaller than a prescribed level $\alpha$, namely, when the rate of change of the flow rate as to the EGR valve 27 or the intake air throttle valve 29 is substantially negligible, then it is judged that at least one of the EGR valve 27 and the intake air throttle valve 29 is under a state in the dead zone. However, in the embodiment that is hereby described (in a dead zone evaluating means 100), the oxygen concentration detected by an oxygen concentration meter 102 is used instead of the calculated estimation excess air ratio $\lambda$ in order to evaluate whether the valves are operated in their dead zones or not.

FIG. 10 depicts the configuration of the present embodiment. An oxygen concentration meter 102 is provided at the inlet manifold that is an air or gas passage at the down stream side of the confluence as to the EGR passage 23 and the intake air passage 13. As depicted in FIG. 10, a dead zone evaluating means 100 in an EGR (exhaust gas re-circulation) control unit 104 judges whether or not the rate of change of the oxygen concentration detected by the meter 102 is smaller than or equal to a prescribed threshold level. If the detected oxygen concentration is smaller than or equal to the threshold level, then the evaluating means 100 judges that at least one of the valves 27 and 29 is operated in its dead zone. The dead zone compensating means 66 in the dead zone evaluating means 100 makes the revisions as to the opening command line L1 for the intake air throttle valve 29 and the opening command line L2 for the EGR valve 27.

Thus, the oxygen concentration of the air or gas inhaled into the combustion chamber is detected by the oxygen concentration meter 102 that is provided at the inlet manifold that is the air or gas passage at the down stream side of the confluence as to the EGR passage 23 and the intake air passage 13; thereby, the residual air (the air [or oxygen] that is not-used in combustion) is taken into consideration. Further, on the basis of the rate of change of the oxygen concentration, it is judged whether the valves are operated in their dead zones or not; namely, the judgment is not based on the change in the air/gas flow that streams into the combustion chamber, but based on the rate of change of the detected oxygen concentration of the air/gas flow. Therefore, an accurate judgment can be achieved.

In the present embodiment, in making the above described judgment, only the signals from the oxygen concentration meter 102 is needed. Thus, the valve opening control can be simplified in comparison with the manner in which the inhaled air/gas pressure and temperature are detected and the estimation excess air ratio $\lambda_s$ is calculated through the predetermined formulae.

INDUSTRIAL APPLICABILITY

According to the present invention, an EGR control unit to control a diesel engine can be provided, the unit being configured so as to control the EGR valve and the intake air valve with a simple control command signal that makes both the valves be operated in a coupled mode, whereby the response performance as to the engine speed during acceleration as well as the EGR gas flow rate is enhanced by means of compensation regarding the dead zones inherent in the intake air throttle valve and the EGR valve. In particular, the present invention can provide an EGR control unit for the internal combustion engines, whereby the EGR system can be stopped in response to hard acceleration within a fraction of a second from the moment of a greater EGR flow rate condition, the greater EGR flow rate condition meaning a condition where the EGR valve is fully opened, the intake air throttle valve is activated in a closing direction so as to decrease the inhaled fresh air, and a significant amount of EGR gas is inhaled into the engine. Thus, the present invention is applicable to the internal combustion engines such as diesel engines.

The invention claimed is:

1. An EGR control unit to control a diesel engine, the engine comprising:
an EGR valve by which EGR flow rate of the engine is adjusted,
an intake air throttle valve by which the intake air flow rate of the engine is adjusted, and
a mechanism in which the opening of the EGR valve is operated in conjunction with the opening of the air throttle valve; wherein,
each of opening determining lines (characteristic curves) and as to the opening of the EGR valve and the air throttle valve has a dead zone part where a flow rate stays unchanged even the opening of the valve is increased beyond a certain opening level;
the EGR control unit is provided with a dead zone evaluating means that calculates an estimation excess air ratio $\lambda$ in consideration of the residual oxygen in the EGR gas; thereby, it is judged that at least one of the EGR valve and the air throttle valve is operated in the dead zone based on a rate of change of the calculated estimation excess air ratio $\lambda$ when the rate of change of the estimation excess air ratio $\lambda$ is smaller than a prescribed level; and
the EGR control unit is provided with a dead zone compensating means that makes revisions regarding opening command signals as to the EGR valve and the intake air throttle valve so that the dead zones do not hinder the mechanism regarding the conjunct opening operation when the dead zone evaluating means judges that at least one of the EGR valve and the air throttle valve is operated in the dead zone, and the engine is under a transient response condition.

2. The EGR control unit to control a diesel engine according to claim 1, the unit further comprising an EGR-and-throttle valve opening level setting means in which an EGR valve opening command signal and an air throttle valve opening command signal are generated from a simple control command signal whereby the opening command determining line for each of the valves is specified as a function of the simple control command signal; wherein,
the opening determining line as to the intake air throttle valve opening command signal continues its linear upward course, as the simple control command signal increases,
while the opening determining line as to the EGR valve opening command signal continues its linear downward course as the simple control command signal increases;
the upward line part of the intake air throttle valve opening command signal and the downward line part of the EGR valve opening command signal intersect each other;
in the dead zone compensating means, the opening determining line as to the intake air throttle valve opening command signal, and the opening determining line as to the EGR valve opening command signal are shifted in response to the increase or decrease of the simple control command signal, along the direction of the axis as to the simple control command signal.

3. The EGR control unit to control a diesel engine according to claim 2, wherein the dead zone compensating means shifts the opening determining line as to the EGR valve opening command signal in the direction in which the dead zone of the EGR valve is narrowed in response to the opening increase of the intake air throttle valve the opening which moves along the opening determining line thereof based on the order of the simple control command signal as the signal for the intake air throttle valve.

4. The EGR control unit to control a diesel engine according to claim 3,
wherein the dead zone compensating means shifts the opening determining line as to the EGR valve opening command signal back to the original position where the dead zone as to the EGR valve is not narrowed, after the simple control command signal as the signal for the intake air throttle valve reaches a point where the downward line part as to the EGR valve opening determining line the dead zone of which is narrowed intersects with the horizontal axis as to the simple control command signal, as well as after the simple control command signal as the signal for the intake air throttle valve passes through the point in an increasing direction.

5. The EGR control unit to control a diesel engine according to claim 2,
wherein the dead zone compensating means shifts the opening determining line as to the intake air throttle valve opening command signal in the direction in which the dead zone of the intake air throttle valve is narrowed in response to the opening increase of the EGR valve the opening which moves along the opening determining line thereof based on the order of the simple control command signal as the signal for the EGR valve.

6. The EGR control unit to control a diesel engine according to claim 5,
wherein the dead zone compensating means shifts the opening determining line as to the intake air throttle valve opening command signal back to the original position where the dead zone as to the intake air throttle valve is not narrowed, after the simple control command signal as the signal for the intake air throttle valve reaches a point where the upward line part as to the intake air throttle valve opening determining line the dead zone of which is narrowed intersects with the horizontal axis as to the simple control command signal, as well as after the simple control command signal as the signal for the intake air throttle valve passes through the point in a decreasing direction.

7. The EGR control unit to control a diesel engine according to claim 1,
   the unit being provided with an oxygen concentration meter at the air or gas passage at the down stream side of the confluence as to the EGR passage and the intake air passage,
   wherein the dead zone evaluating means by use of the calculated estimation excess air ratio is replaced with a dead zone evaluating means that judges whether or not at least one of the intake air throttle valve and the EGR valve is operated in the dead zone based on not the calculated estimation excess air ratio but the oxygen concentration detected by the oxygen concentration meter.

\* \* \* \* \*